June 10, 1958  H. W. CLIFFORD ET AL  2,837,825
APPARATUS FOR MEASURING AND MARKING ELONGATE ARTICLES
Filed July 6, 1955
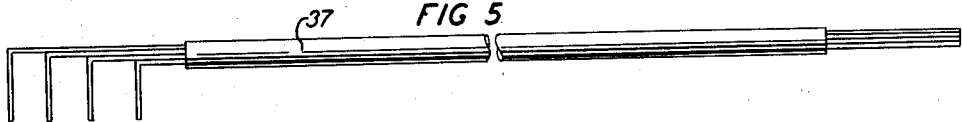
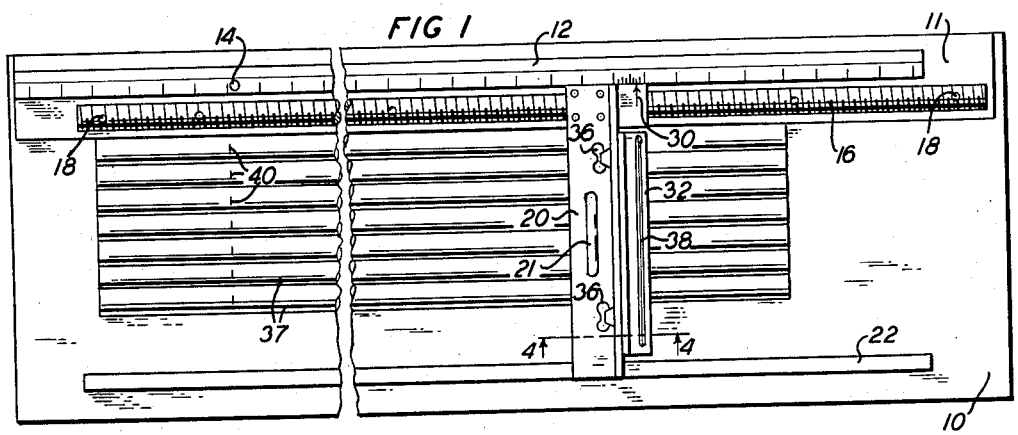
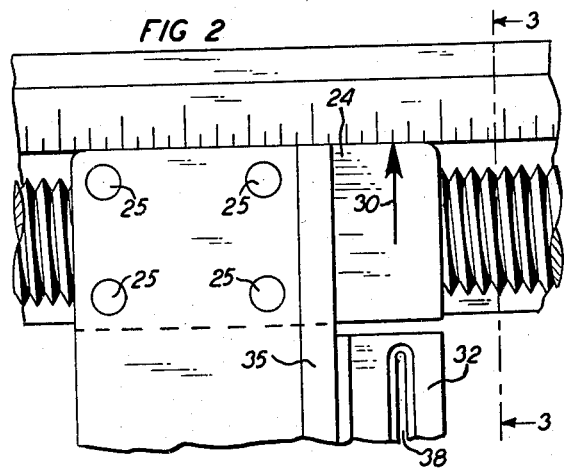
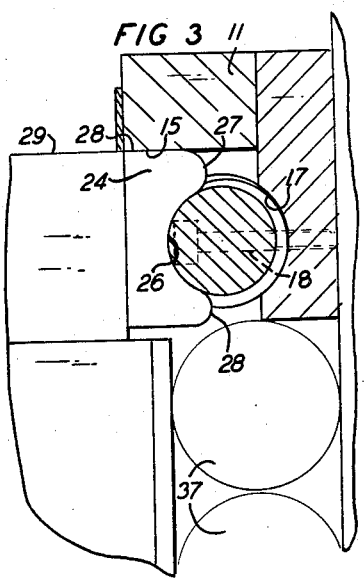
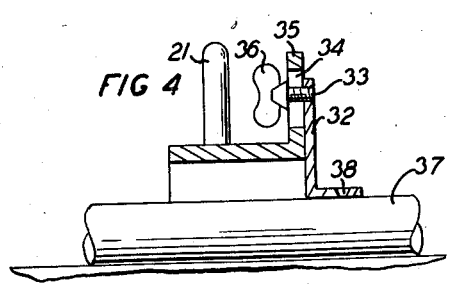
INVENTORS
H. W. CLIFFORD
E. S. GEARY
BY
ATTORNEY

United States Patent Office 2,837,825
Patented June 10, 1958

2,837,825

APPARATUS FOR MEASURING AND MARKING ELONGATE ARTICLES

Harry W. Clifford, East Orange, and Edward S. Geary, Nutley, N. J., assignors to Western Electric Company, Incorporated, New York, N. Y., a corporation of New York Application July 6, 1955, Serial No. 520,236

3 Claims. (Cl. 33—32)

This invention relates to apparatus for measuring and marking elongate articles particularly switchboard cables.

The wiring of telephone equipment requires telephone cable of predetermined lengths with the sheath removed from predetermined lengths at the ends of these cables. In the past, these lengths of cables have been cut and measured singly for the removal of the sheath end portions. During the wiring of switchboard frames or other equipment, groups of cables of like lengths are to be used, thus presenting opportunity of expediting the processing of the cables if these groups of cables could be measured and marked simultaneously.

An object of the present invention is an apparatus for use in measuring and marking elongate articles.

In one embodiment of the invention, the apparatus includes a calibrated scale mounted on a support for elongate articles adjacent an elongate screw having a thread pitch corresponding to the calibrations on the scale so that a threaded follower on a crossbar may be located at any one of the calibrations for use in marking the articles.

More specifically, the calibrated scale is mounted on a table-like support parallel with the fixedly mounted screw and provided with a flat face to be engaged by an adjacent end of the crossbar to firmly hold the crossbar perpendicular to the scale. The threaded follower supported by and fixed to the crossbar has threads corresponding to the threads of the screw and serving not only to locate the crossbar accurately relative to the scale but as a wedge between the screw and the face of the scale to position the crossbar accurately and hold it in place.

Other objects and advantages will be apparent from the following detailed description when considered in conjunction with the accompanying drawing, wherein:

Fig. 1 is a top plan view of the apparatus;

Fig. 2 is an enlarged fragmentary top plan view of the apparatus at the juncture of the crossbar and the scale;

Fig. 3 is a fragmentary sectional view taken along the line 3—3 of Fig. 2;

Fig. 4 is an enlarged vertical sectional view taken along the line 4—4 of Fig. 1, and Fig. 5 is a side elevational view of one of the cables.

Referring now to the drawing, attention is directed to Fig. 1 which illustrates a support 10 which may be a table or bench of suitable length depending upon the maximum length of the cable to be processed by this apparatus. A supporting structure or element 11, L-shaped in cross-section, is mounted upon the support 10. A calbrated scale 12 is mounted upon the highest portion of the element 11 and is calibrated in both directions from a "zero" position 14 in feet, inches and fractions of each inch. The element 11 and the calibrated scale 12 jointly form a face 15 or reference surface for a purpose hereinafter described.

An elongate screw 16 is disposed initially in a recess 17 of the element 11 where it is secured in place by suitable means such as screws 18. The screw 16 has a thread pitch corresponding to the calibrations on the scale. In the present embodiment of the invention each thread width represents ⅛ inch in longitudinal measurement of the screw corresponding to the ⅛ inch calibrations on the scale as illustrated in Fig. 2.

A crossbar 20 is provided wih a handle 21 so that it may be transported manually to any desired position relative to the scale 12. One end of the crossbar is positioned to rest upon a rail 22 mounted on the support 10 at a position spaced from the scale 12. The other end of the crossbar has a follower 24 extending the full width of the crossbar and a given distance beyond at the right as shown in Figs. 1 and 2. The follower is fixed to the crossbar by suitable means 25 and has thread portions 26 formed in a recess in the undersurface of the follower.

In the present embodiment of the invention, the follower 24 may be produced from a nut-like member, provided with internal threads of the same pitch as the threads of the screw 16, by cutting the nut in half longitudinally and rounding surfaces 27 and 28 as illustrated in Fig. 3. A surface 28 of the follower 24 and a surface 29 of the crossbar will engage the face 15 of the element 11 and the scale 12 to assure positioning of the crossbar at right angles to the scale regardless of the position of the crossbar on the screw 16. The positioning of the portion adjacent the rounded surface 27 of the follower and the nesting of the threads of the follower with the threads of the screw, produce, not only an aligning action of the crossbar (the arrow 30) with the selected calibration on the scale, but produce a wedging action forcing the surfaces of the follower and crossbar into close engagement with the surface 15 of the element and the scale.

An angle member 32 carrying threaded studs 33, which extend through elongate apertures 34 of a vertical portion 35 crossbar, receive wingnuts 36 to secure the member 32 for adjustment vertically for cables or elongate articles 37 of various sizes. An elongate aperture 38, disposed in the horizontal portion of the angle member 32 in alignment with the arrow 30 has outwardly tapered surfaces adapting it to readily receive a marking tool and guide it while marking a plurality of elongate articles such as the cables 35.

For the purpose of illustration, let it be assumed a plurality of cables having over all lengths of ten feet are to have the sheath removed two and one-half feet from each end thereof. These cables are cut to length and placed upon the table or support 10 so that their left ends are positioned to the left of the "zero" position 14, two feet six inches as determined by the scale 12. When this group of elongate articles or, in this instance, switchboard cables are located initially with respect to the "zero" position, the crossbar 20 may be located with respect to the scale 12 and the screw 16 so that the arrow 30 will be aligned with the "zero" indication 14 on the scale. The crossbar of its own weight or with added pressure by the operator will find its accurate position with respect to the scale through the interengagement of the threads 26 of the follower and the threads of the screw 16. At this time, the operator, through the aid of a suitable marking tool, may place the marks as indicated at 40 upon the articles or cables by moving the marking tool through the elongate aperture 38. When this has been accomplished, the operator removes the crossbar from the "zero" position and moves it until the arrow 30 registers with the five feet position on the scale after which the crossbar may be lowered in place where it is anchored and secured in its perpendicular position with respect to the scale. At this time, the second marking may be placed on the articles indicating the positions where the sheath shall be cut and removed from the conductors.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for measuring and marking elongate articles comprising an elongate support for the articles, a calibrated scale mounted on the support and extending longitudinally thereof, an elongate screw having a thread pitch corresponding to the calibration on the scale fixedly mounted on the support parallel with the scale, a crossbar adapted to be disposed at any desired position relative to the scale transversely of the articles and the support, a follower fixed to the crossbar and having a recess with internal threads formed for interengagement with the threads of the screw to removably locate the crossbar at any desired calibrated position, a pointer disposed on the follower for registration with any of the calibrations on the scale, an element carried by the crossbar and having a longitudinally extending slot for a marker disposed in alignment with the pointer, and means to adjustably secure the element to the crossbar at different vertical positions parallel with the support for resting on articles of different thicknesses disposed on the support.

2. An apparatus for measuring and marking elongate articles comprising an elongate horizontal support for the articles, a calibrated scale mounted upon, extending longitudinally of the support and having a flat vertical face, an elongate screw having a thread pitch corresponding to the calibrations on the scale fixedly mounted on the support parallel with the scale and spaced a given distance from the vertical face thereof, a crossbar having a reference surface at one end thereof, and a follower fixed to the crossbar adjacent the reference surface and having a recess with internal threads formed for interengagement with the threads of the screw to removably locate the crossbar at any desired calibrated position relative to the scale and to cause the reference surface of the crossbar to closely engage the face of the scale.

3. An apparatus for measuring and marking elongate articles comprising an elongate horizontal support, for the articles, having a vertically extending member, a calibrated scale mounted upon, extending longitudinally of the vertically extending member and having a flat vertical face disposed in a plane with a surface of the vertical member, an elongate screw having a thread pitch corresponding to the calibrations on the scale fixedly mounted on the support parallel with the scale, a crossbar having a reference surface at one end thereof, a follower fixed to the crossbar and having a recess with internal threads formed for interengagement with the threads of the screw to removably locate the crossbar at any desired calibrated position relative to the scale, the follower also having a portion extending between the fixed screw and the surface of the vertical member to serve as a wedge to guide the reference surface of the crossbar into intimate engagement with the face of the scale, and a guide for a marker secured to the crossbar.

References Cited in the file of this patent

UNITED STATES PATENTS

| 943,886 | Nunamaker | Dec. 21, 1909 |
| 1,600,545 | Hooper | Sept. 21, 1926 |

FOREIGN PATENTS

| 289,914 | Great Britain | Apr. 20, 1928 |
| 73,314 | Norway | Mar. 22, 1948 |